(12) United States Patent
Ayediran et al.

(10) Patent No.: US 7,533,097 B2
(45) Date of Patent: May 12, 2009

(54) DYNAMIC USER INTERFACE CREATION BASED ON USER RESPONSIBILITIES AND COMPANY POLICIES

(75) Inventors: Abiola O. Ayediran, Cary, NC (US); Justin T. Dubs, Raleigh, NC (US); John H. Nicholson, III, Durham, NC (US); Jennifer L. Zawacki, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 10/880,131

(22) Filed: Jun. 29, 2004

(65) Prior Publication Data

US 2005/0289104 A1 Dec. 29, 2005

(51) Int. Cl.
*G06G 17/30* (2006.01)
(52) U.S. Cl. .......................... 707/9; 707/200; 707/201; 707/202; 707/203; 707/204; 707/205; 707/206; 707/3
(58) Field of Classification Search ................. 709/223, 709/320; 707/5, 10, 9, 1.9, 200–206; 717/136; 713/1
See application file for complete search history.

(56) References Cited

U.S. PATENT DOCUMENTS

| | | | |
|---|---|---|---|
| 5,797,128 A * | 8/1998 | Birnbaum ........................ 707/5 |
| 5,819,296 A * | 10/1998 | Anderson et al. ............ 707/204 |
| 6,170,009 B1 * | 1/2001 | Mandal et al. ............... 709/223 |
| 6,266,679 B1 * | 7/2001 | Szalwinski et al. .......... 707/204 |
| 7,130,854 B2 * | 10/2006 | Beadles et al. ................. 707/10 |
| 7,146,388 B2 * | 12/2006 | Stakutis et al. .............. 707/204 |
| 2002/0165906 A1 | 11/2002 | Ricart et al. ................. 709/203 |
| 2002/0174010 A1 * | 11/2002 | Rice, III ...................... 705/14 |
| 2003/0115313 A1 | 6/2003 | Kanada et al. ............... 709/223 |
| 2003/0154404 A1 | 8/2003 | Beadles et al. .............. 713/201 |
| 2003/0158759 A1 | 8/2003 | Kannenberg .................... 705/4 |
| 2003/0158760 A1 | 8/2003 | Kannenberg .................... 705/4 |
| 2003/0225927 A1 * | 12/2003 | Goodman et al. ............... 707/5 |
| 2003/0233425 A1 | 12/2003 | Lyons et al. ................. 709/217 |
| 2004/0068715 A1 * | 4/2004 | Wong et al. .................. 717/136 |
| 2004/0098419 A1 | 5/2004 | Bantz et al. |
| 2004/0199566 A1 | 10/2004 | Carlson et al. |
| 2005/0086457 A1 * | 4/2005 | Hohman ........................ 713/1 |
| 2005/0125463 A1 * | 6/2005 | Joshi et al. .................. 707/204 |

OTHER PUBLICATIONS

Foltz, D. et al., "Method for Integrating LAN Server Security with Distributed Computing Environment," IBM Technical Disclosure Bulletin, vol. 39, No. 5, May 1996, pp. 221-224.

(Continued)

*Primary Examiner*—Don Wong
*Assistant Examiner*—Sheree N Brown
(74) *Attorney, Agent, or Firm*—Sawyer Law Group LLP

(57) ABSTRACT

In a customizable data migration method and system, when a migration program is launched, it queries a system server for entity-level and user-level policies. The migration program then creates a customized interface to the user, where the entity-level and user-level polices are applied with hierarchical priorities. In this manner, flexibility is provided in the data migration process. The end user is allowed to maintain a personality on a given user system and to transfer this personality along with the company specified data. This increases the uptime of the user by reducing the re-customization time when the user is cascaded to a new user system.

4 Claims, 3 Drawing Sheets

OTHER PUBLICATIONS

Kaczmarski, M.A. et al., "Using Policy Domains to Delegate Administrative Authority in Distributed System Managed Storage," IBM Technical Disclosure Bulletin, vol. 36, No. 8, Aug. 1993, pp. 135-138.

Smith, Kime H., Jr., "The Implementation of a Common User Interface Design Across a Heterogeneous Host/Display Device Environment," IEEE 1989, vol. IV, pp. 36-42.

* cited by examiner

DYNAMIC USER INTERFACE CREATION BASED ON USER RESPONSIBILITIES AND COMPANY POLICIES

FIELD OF THE INVENTION

The present invention relates to data migration, and more particularly to the dynamic creation of user interfaces for data migration.

BACKGROUND OF THE INVENTION

Needing to migrate a user from one computer to another is a common problem in today's workplace. The migration requires a determination of what data to migrate for the particular user and user system or machine involved.

Software solutions currently exist for transferring user data from one system to another. However, these solutions allow either full administrator control or full user control, which can result in either user data loss, if files have unexpected names or locations, or in the migration of files not allowed by the company, such as MP3 files or videos.

Accordingly, there exists a need for a customizable data migration method and system. The method and system should dynamically create a user interface for data migration based upon hierarchical entity-level and user-level policies. The present invention addresses such a need.

SUMMARY OF THE INVENTION

In a customizable data migration method and system, when a migration program is launched, the migration program queries a system server for entity-level and user-level policies. The migration program then creates a customized interface to the user, where the entity-level and user-level policies are applied with hierarchical priorities. In this manner, flexibility is provided in the data migration process. The end user is allowed to maintain a personality on a given user system and to transfer this personality along with the company specified data. This increases the uptime of the user by reducing the re-customization time when the user is cascaded to a new user system.

DETAILED DESCRIPTION

The present invention provides a customizable data migration method and system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
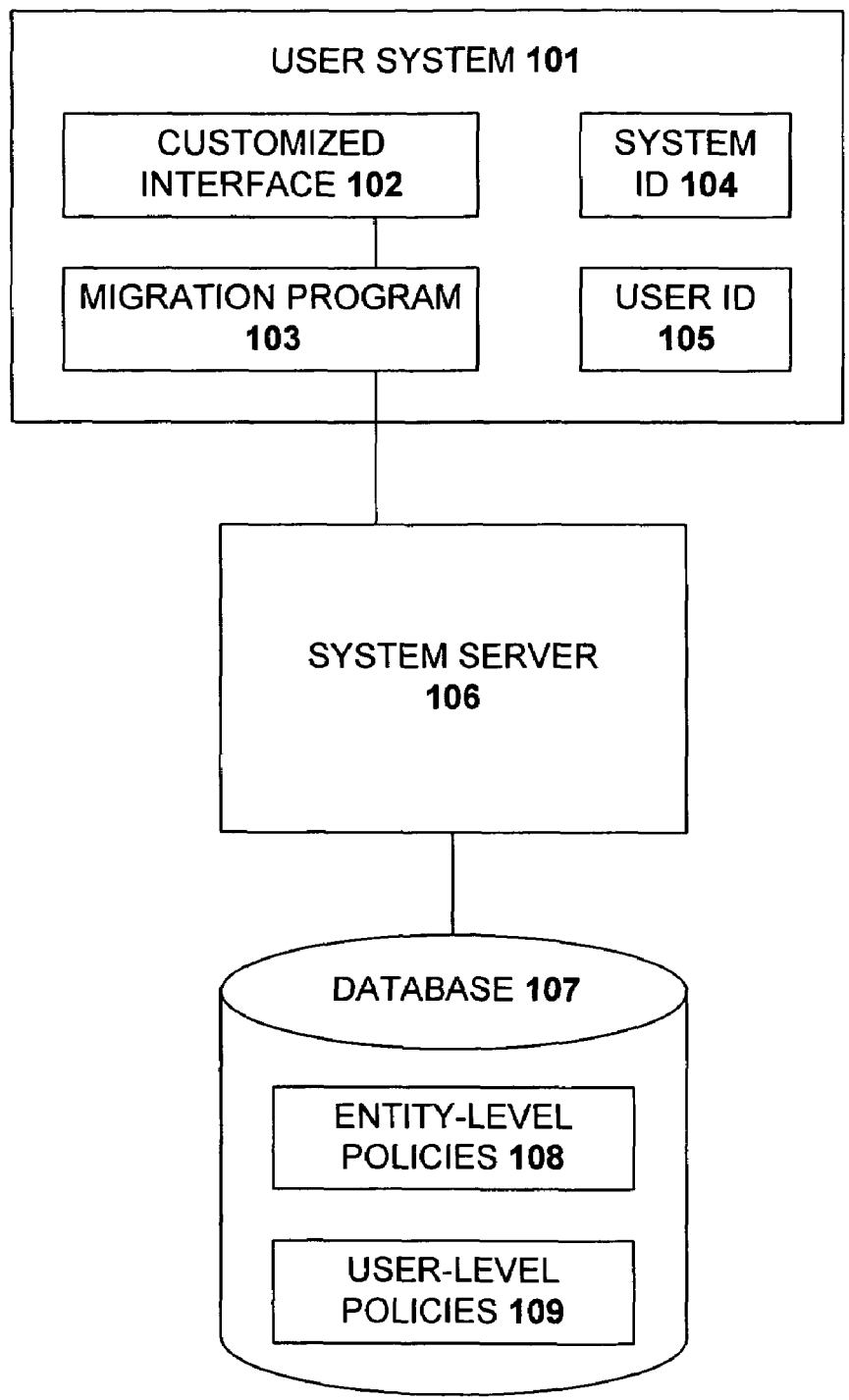
FIG. 1 illustrates a preferred embodiment of a customizable data migration system in accordance with the present invention.

FIG. 1 illustrates a preferred embodiment of a customizable data migration system in accordance with the present invention. The system includes a user system 101 or machine, a system server 106, and a database 107. The database 107 contains entity-level policies 108 and user-level policies 109. Other levels of policies can also be stored in the database 107. Here, the policies are hierarchical, i.e., each set of policies is assigned a priority. For example, the entity-level policies 108 can be the company-wide policies applicable to all user systems and thus has higher priority than the user-level policies 109.

The user system 101 has a unique system ID 104, while the user of the system 101 has a unique user ID 105. At the user system 101 is a migration program 103. The interface 102 for the migration program 103 is customized based on the entity-level policies 108 and the user-level policies 109 stored at the database 107. In the preferred embodiment, the user-level policies 109 for the specific user system 101 and user are stored based on the system ID 104 and the user ID 105.

Figure 2:
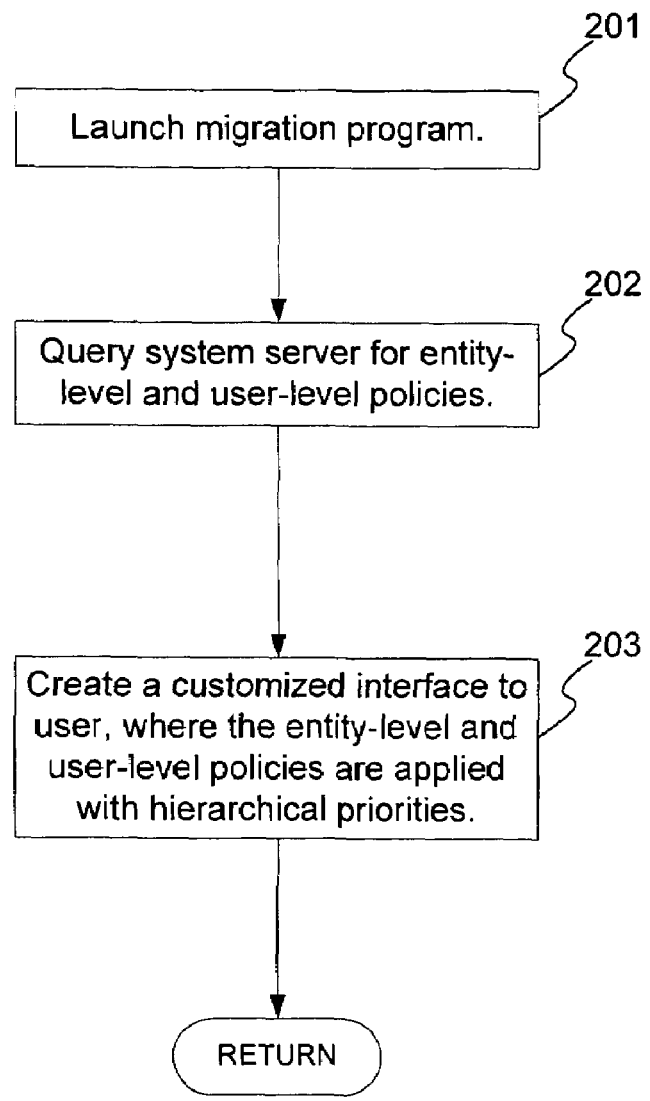
FIG. 2 is a flowchart illustrating a preferred embodiment of a method for providing customized data migration in accordance with the present invention.

FIG. 2 is a flowchart illustrating a preferred embodiment of a method for providing customized data migration in accordance with the present invention. Referring to both FIGS. 1 and 2, first the migration program 103 is launched, via step 201. Next, the system server is queried for the entity-level 108 and user-level policies 109 for the particular user and user system 101, via step 202. These policies 108 and 109 are returned to the migration program 103. The migration program then creates the customized interface 102 to the user, where the entity-level 108 and user-level 109 policies are applied with hierarchical priorities, via step 203. For example, additional settings can be provided in the customized interface 102 for users with more authority, while these settings are missing for other users.

Figure 3:
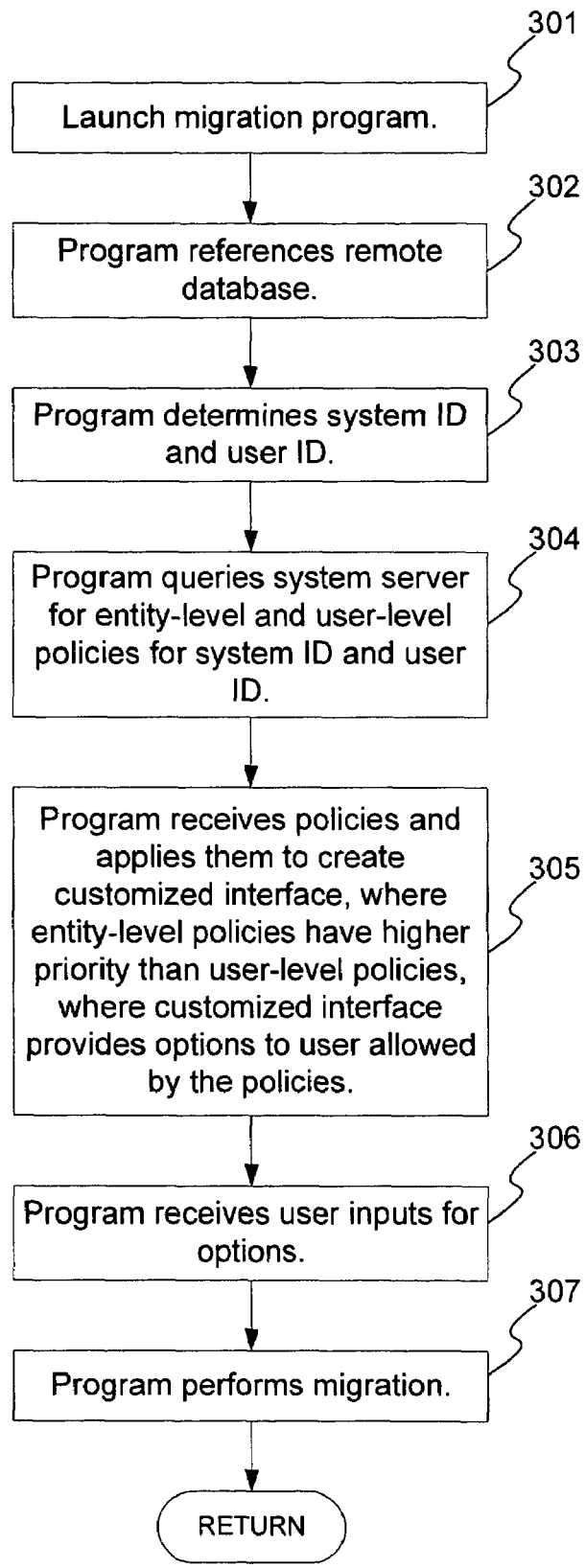
FIG. 3 is a flowchart illustrating in more detail the method for providing a customized data migration in accordance with the present invention.

FIG. 3 is a flowchart illustrating in more detail the method for providing a customized data migration in accordance with the present invention. When the migration program 103 is launched, via step 301, the migration program 103 first references the remote database 107, via step 302. The migration program 103 then determines the system TD 104 and user ID 105 for the user system 101, via step 303. The migration program 103 next queries the system server 106 for the entity-level 108 and user-level 109 policies for the system ID 104 and user ID 105, via step 304. The server system 106 obtains these policies 108 and 109 from the database 107 and sends them to the migration program 103.

When the migration program 103 receives these policies 108 and 109, it applies them to create the customized interface 102, via step 305. In creating the interface 102, the entity-level policies 108 have higher priority than the user-level policies 109. The customized interface 102 provides options to the user that are allowed by the policies 108 and 109. Here, users with more authority are given the opportunities to provide additional settings and files to save that are allowed within the entity-level policies 108. The migration program 103 receives any user inputs for the options, via step 306, and then performs the migration, via step 307.

For example, assume that the entity-level policies 108 disallow the migration of MP3 files. Regardless of the role of the user or any department level policies, the option to migrate MP3 files is not provided as part of the customized interface 102. Assume then that the user's role is a technical designer.

The user-level policies 109 for this user saves all CAD files by default. The option to override this default can be provided as part of the user's customized interface 102. If the user's role is a software engineer, then the user-level policies 109 for this user saves all CPP and Java files by default. The option of select other such files can be provided as part of the customized interface 102 for this user.

A customizable data migration method and system has been disclosed. In the method and system, when a migration program is launched, the migration program queries a system server for entity-level and user-level policies. The migration program then creates a customized interface to the user, where the entity-level and user-level policies are applied with hierarchical priorities. In this manner, flexibility is provided in the data migration process. The end user is allowed to maintain a personality on a given user system and to transfer this personality along with the company specified data. This increases the uptime of the user by reducing the re-customization time when the user is cascaded to a new user system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for migrating data files associated with a user from a first computer system to a second computer system, the first computer system having a unique system identifier (ID), the user having a unique user identifier (ID), the method comprising:

querying a database for company-wide policies that specify which types of data files are not movable from the first computer system to the second computer system, the company-wide policies being queried from the database based on the unique system identifier (ID) of the first computer system;

querying the database for user-level policies that specify which types of data files are movable from the first computer system to the second computer system, the user-level policies being queried from the database based on the unique user identifier (ID) of the user, the user-level policies specifying which types of data files are movable from the first computer system to the second computer system based on a role of the user, and wherein the role of the user is a technical designer, and the types of data files that are movable from the first computer system to the second computer system as specified by the user-level policies include computer-aided design (CAD) files;

receiving the company-wide and user-level policies from the database;

creating a customizable user-interface to migrate data files associated with the user from the first computer system to the second computer system based on assigning a hierarchical priority to the company-wide and user-level policies wherein the company-wide policies have a higher priority than the user-level priorities, wherein the user-interface does not provide an option to migrate the types of data files that are not movable from the first computer system to the second computer system as specified by the company-wide policies, and the user interface provides at least one option to migrate the types of data files movable from the first computer system to the second computer system as specified by the user-level policies;

displaying the user-interface at the first computer system;

receiving user inputs for the at least one option; and performing the migration.

2. A method for migrating data files associated with a user from a first computer system to a second computer system, the first computer system having a unique system identifier (ID), the user having a unique user identifier (ID), the method comprising:

querying a database for company-wide policies that specify which types of data files are not movable from the first computer system to the second computer system, the company-wide policies being queried from the database based on the unique system identifier (ID) of the first computer system;

querying the database for user-level policies that specify which types of data files are movable from the first computer system to the second computer system, the user-level policies being queried from the database based on the unique user identifier (ID) of the user, the user-level policies specifying which types of data files are movable from the first computer system to the second computer system based on a role of the user, and wherein the role of the user is a software engineer, wherein the types of data files that are movable from the first computer system to the second computer system as specified by the user-level policies include C++ source code (CPP) files and Java files;

receiving the company-wide and user-level policies from the database;

creating a customizable user-interface to migrate data files associated with the user from the first computer system to the second computer system based on assigning a hierarchical priority to the company-wide and user-level policies wherein the company-wide policies have a higher priority than the user-level priorities, wherein the user-interface does not provide an option to migrate the types of data files that are not movable from the first computer system to the second computer system as specified by the company-wide policies, and the user interface provides at least one option to migrate the types of data files movable from the first computer system to the second computer system as specified by the user-level policies;

displaying the user-interface at the first computer system receiving user inputs for the at least one option; and performing the migration.

3. The method of claim 2, wherein the option to migrate the types of data files that are to be saved from the first computer system to the second computer system as specified by the user-level policies is a default option provided by the user-interface.

4. The method of claim 3, wherein the user-interface includes an option to override the default option.

* * * * *